(12) United States Patent
Yoneoka et al.

(10) Patent No.: US 11,139,714 B2
(45) Date of Patent: Oct. 5, 2021

(54) AXIAL GAP ROTARY ELECTRIC MACHINE

(71) Applicant: Hitachi Industrial Equipment Systems Co., Ltd., Tokyo (JP)

(72) Inventors: Yasuei Yoneoka, Tokyo (JP); Shuuichi Takahashi, Tokyo (JP); Toshifumi Suzuki, Tokyo (JP); Toru Sakai, Tokyo (JP); Katsuyuki Yamazaki, Tokyo (JP); Daisaku Takahashi, Tokyo (JP); Daisuke Kurai, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 196 days.

(21) Appl. No.: 16/475,736

(22) PCT Filed: Jan. 31, 2017

(86) PCT No.: PCT/JP2017/003294
§ 371 (c)(1),
(2) Date: Jul. 3, 2019

(87) PCT Pub. No.: WO2018/142442
PCT Pub. Date: Aug. 9, 2018

(65) Prior Publication Data
US 2021/0135530 A1    May 6, 2021

(51) Int. Cl.
*H02K 3/52* (2006.01)
*H02K 21/24* (2006.01)
(52) U.S. Cl.
CPC .............. *H02K 3/522* (2013.01); *H02K 21/24* (2013.01); *H02K 2203/06* (2013.01)
(58) Field of Classification Search
CPC .... H02K 3/522; H02K 21/24; H02K 2203/06; H02K 21/026; H02K 5/08; H02K 2203/09
(Continued)

(56) References Cited

U.S. PATENT DOCUMENTS

| 6,856,055 B2* | 2/2005 | Michaels ............... H02K 3/522 310/254.1 |
| 8,154,163 B2* | 4/2012 | Inoue ..................... H02K 3/522 310/71 |

(Continued)

FOREIGN PATENT DOCUMENTS

| JP | 2006-166598 A | 6/2006 |
| JP | 2008-118833 A | 5/2008 |

(Continued)

OTHER PUBLICATIONS

International Search Report (PCT/ISA/210) issued in PCT Application No. PCT/JP2017/003294 dated May 9, 2017 with English translation (five pages).

(Continued)

*Primary Examiner* — Alex W Mok
(74) *Attorney, Agent, or Firm* — Crowell & Moring LLP (57) ABSTRACT

A conventional axial gap rotary electric machine does not consider winding movement caused by resin molding in the vicinity of a lead-out part provided to a housing. In order to solve the problem, the axial gap rotary electric machine according to the present invention includes a stator which is formed by circularly arranging a plurality of core units having coils about a rotation shaft and which has a connecting wire that fastens, for each layer, coil rising wires from the plurality of core units, and the axial gap rotary electric machine has a configuration in which: the housing has a lead-out part through which the connecting wire is taken out to the outside of the housing; and the stator is arranged such that the region where the coil rising wire from the core unit is fastened with the connecting wire is located so as to avoid the region opposed to the lead-out part, the stator being integrally molded.

8 Claims, 5 Drawing Sheets

(58) Field of Classification Search
USPC .......................................................... 310/66
See application file for complete search history.

(56) References Cited

U.S. PATENT DOCUMENTS

| | | | |
|---|---|---|---|
| 2004/0164641 A1* | 8/2004 | Yamada | H02K 1/148 310/216.105 |
| 2008/0106161 A1 | 5/2008 | Matsuzaki et al. | |
| 2010/0052461 A1* | 3/2010 | Sasaki | H02K 3/522 310/215 |
| 2012/0293024 A1* | 11/2012 | Yokogawa | H02K 1/278 310/43 |
| 2013/0257183 A1* | 10/2013 | Yokogawa | H02K 5/02 310/43 |
| 2014/0292124 A1* | 10/2014 | Nakamura | H02K 15/026 310/71 |
| 2015/0137634 A1* | 5/2015 | Kurita | H02K 1/148 310/71 |
| 2017/0194823 A1 | 7/2017 | Tokoi et al. | |

FOREIGN PATENT DOCUMENTS

| | | |
|---|---|---|
| JP | 2009-261082 A | 11/2009 |
| WO | WO 2004/008610 A1 | 1/2004 |
| WO | WO 2015/159332 A1 | 10/2015 |

OTHER PUBLICATIONS

Japanese-language Written Opinion (PCT/ISA/237) issued in PCT Application No. PCT/JP2017/003294 dated May 9, 2017 (three pages).
Extended European Search Report issued in European Application No. 17895183.6 dated Sep. 18, 2020 (eight (8) pages).

* cited by examiner

AXIAL GAP ROTARY ELECTRIC MACHINE

TECHNICAL FIELD

The present invention relates to an axial gap rotary electric machine in which a rotor and a stator are made to face each other in an axial direction.

BACKGROUND ART

Since the axial gap rotary electric machine has a structure in which the rotor and the stator are made to face each other in the axial direction, there are features in which an axial length can be shortened as compared with a radial gap type, and the rotary electric machine itself can be made thin.

As a background art of the present technical field, there is JP 2008-118833 A (Patent Document 1). Patent Document 1 discloses an axial air gap type electric motor having a configuration in which a connecting wire processing part extending in the axial direction is provided on an outer peripheral side of an insulator end surface constituting a core member, a plurality of support grooves extending in a rotational direction and arranging the connecting wire are included on an outer diameter side of the connecting wire processing part, and the connecting wires of each core member are supported via adjacent connecting wire processing parts.

CITATION LIST

Patent Document

Patent Document 1: JP 2008-118833 A

SUMMARY OF THE INVENTION

Problems to be Solved by the Invention

In Patent Document 1, since the connecting wires of each core member are supported via the adjacent connecting wire processing part, when molding integrally with resin, it is possible to prevent a winding from moving. However, a lead-out part provided in the housing for connecting the connecting wire to a power supply terminal via a terminal box and the like outside the housing is not considered, and the connecting wire processing part cannot be provided near the lead-out part. Thus, there is a problem that the wiring is pushed and moved in the outer peripheral direction by the sealing pressure of the resin flowing toward the lead-out part at the time of resin molding and comes into contact with the housing to cause deterioration.

Solutions to Problems

In view of the above background art and problems, as an example, there is provided an axial gap rotary electric machine which has a stator having a connecting wire for fastening a coil rising wire from a plurality of core units formed by disposing the plurality of core units having coils in an annular shape around a rotation shaft for each layer; a rotor disposed to face the stator in the direction of the rotation shaft; a rotation shaft rotating with the rotor; and a housing for fixing the stator, in which the housing has a lead-out part which extracts the connecting wire out of the housing, and the stator is provided so that a fastening region with the connecting wire of the coil rising wire from the core unit is disposed to avoid a region facing the lead-out part, and is integrally molded.

Effects of the Invention

According to the present invention, it is possible to prevent the movement of the coil rising wire at the time of resin molding even near the lead-out part.

MODE FOR CARRYING OUT THE INVENTION

Hereinafter, an embodiment to which the present invention is applied will be described with reference to the drawings.

Example 1

First, an axial gap rotary electric machine which is a premise of the present invention will be described.

Figure 4:
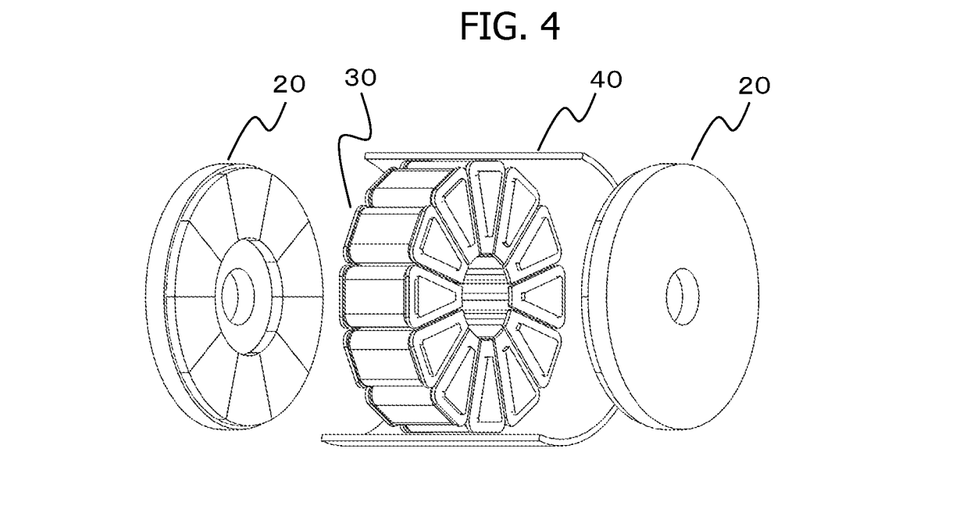
FIG. 4 is a perspective view illustrating a positional relation between a stator, a rotor, and a housing of an axial gap rotary electric machine of related art.

FIG. 4 is a perspective view illustrating a positional relation between a stator, a rotor, and a housing of an axial gap rotary electric machine of related art. There are combinations of one stator one rotor type, one stator two rotor type, two stator one rotor type, and the like as the configuration of the axial gap rotary electric machine, but in this embodiment, the one stator two rotor type will be described as an example.

In FIG. 4, a housing 40 has a cylindrical shape basically extending in a main shaft direction, but a cross-sectional view is illustrated for the sake of description. A stator 30 and a rotor 20 are disposed inside the cylinder of the housing 40. The stator 30 is disposed and fixed at an axially central portion of the housing 40, and the two rotors 20 are disposed to face the stator 30 and sandwich the stator 30 in a main shaft direction (not illustrated).

Figure 5:
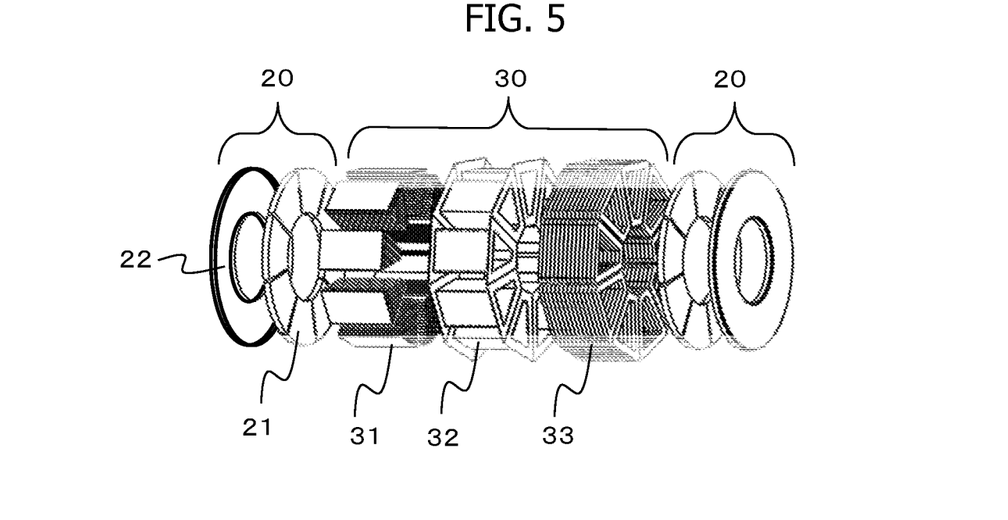
FIG. 5 is a perspective view illustrating a structure of a motor part of the axial gap rotary electric machine of related art.

FIG. 5 is a perspective view illustrating a structure of the stator 30 and the rotor 20 of the axial gap rotary electric machine of related art. As illustrated in FIG. 5, the stator 30 is formed by annularly arranging a plurality of fan-like core units including an iron core 31, a bobbin 32, and a coil 33, and an insulation resin is filled to fill the space between them, thereby forming the integral stator 30. The stator 30 is held by the housing 40 with the adhesive strength of the insulation resin, the housing 40 is configured so as not come off in the axial direction of the stator 30 by providing a step on the inner side thereof, and the housing 40 is configured to prevent from rotating even in the rotational direction, by providing grooves or protrusions such as notches in a part in the rotational direction. The rotor 20 includes a rotor yoke 22 and a permanent magnet 21.

Figure 6:
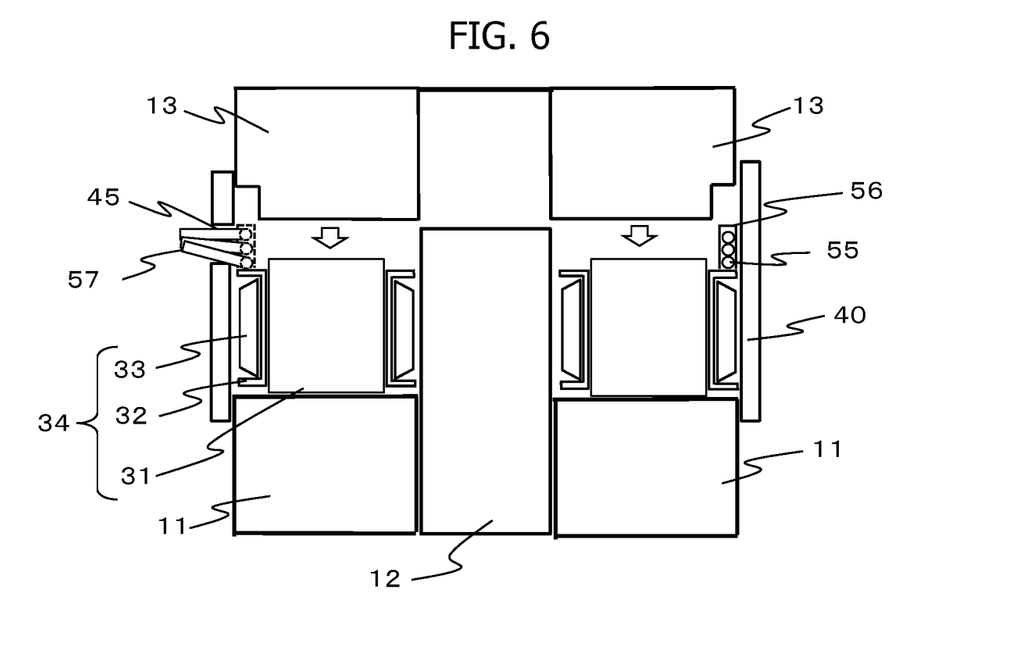
FIG. 6 is a cross-sectional view illustrating a mold formation of the stator of the axial gap rotary electric machine of related art.

FIG. 6 is a cross-sectional view illustrating the mold formation of the stator of the axial gap rotary electric machine of related art. FIG. 6 is a cross-sectional view in the main shaft direction of a core unit 34 including an iron core 31, a bobbin 32 and a coil 33 incorporated in the housing 40, a mold upper die 13 is disposed in the core unit 34 incorporated in the housing 40 installed in a mold die including a mold lower die 11 and a mold middle die 12, and the mold is injected from a mold injection port (not illustrated) to perform the mold formation. Here, a connecting wire 55 is intended to connect the coil drawn out from each core unit for each layer, and a wiring piece 56 is intended to support the connecting wire. Further, a lead-out part 45 is provided in the housing 40, and a lead-out wire 57 is connected to a power supply terminal via a terminal box or the like extracted out of the housing from the lead-out part 45.

Figure 7:
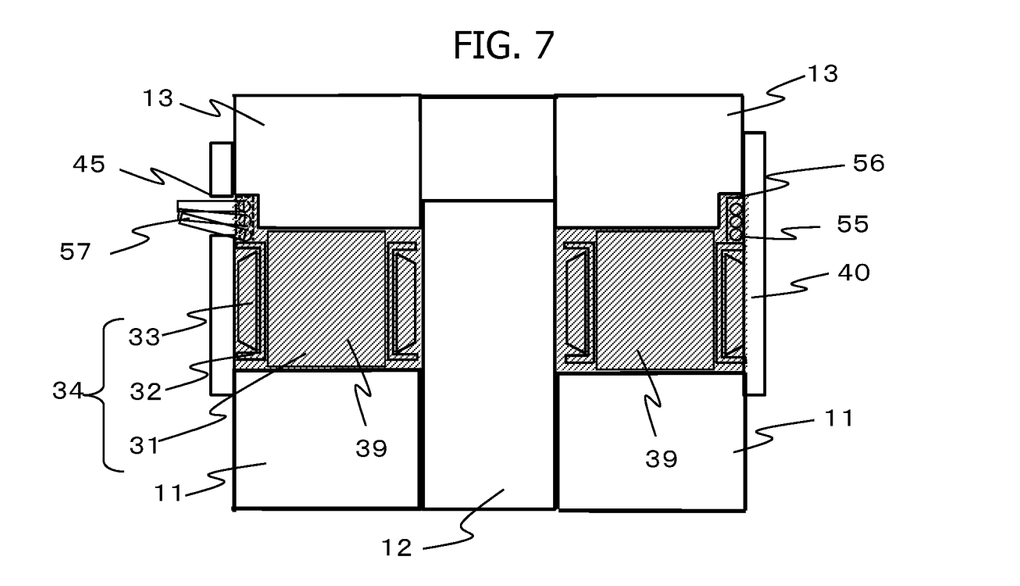
FIG. 7 is a cross-sectional view illustrating a state after the mold formation of the stator of the axial gap rotary electric machine of related art.

FIG. 7 is a cross-sectional view illustrating a state after the mold formation of the stator of the axial gap rotary electric machine of related art. As illustrated in FIG. 7, the core unit 34 and the connecting wire 55 are integrally molded and fixed to the housing 40 by the molding pressure.

Figure 8:
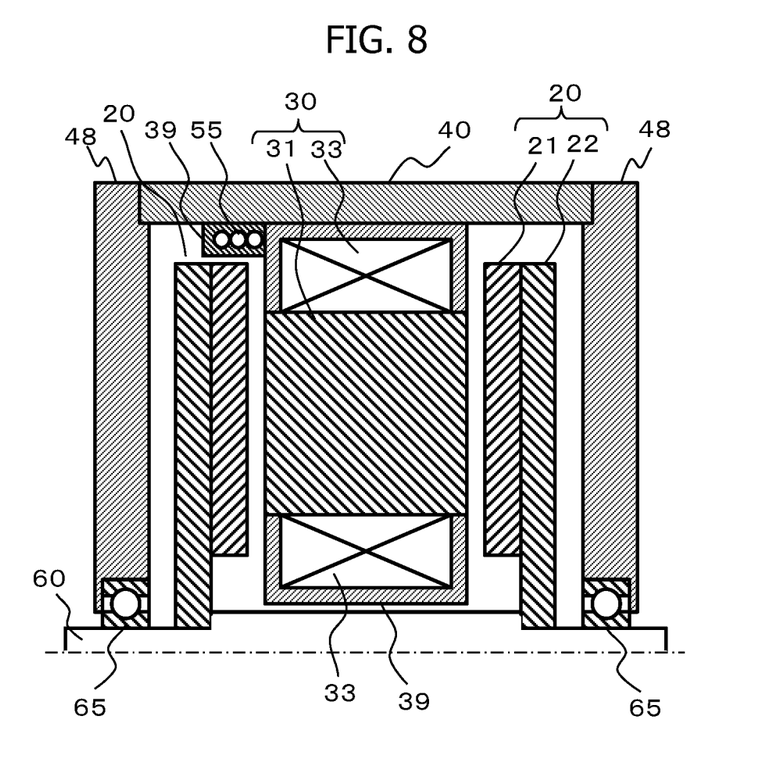
FIG. 8 is a schematic view illustrating the positional relation between the stator, the rotor, and the housing of the axial gap rotary electric machine of related art and illustrating only a cross section on one side with respect to a main shaft.

FIG. 8 is a schematic view illustrating a positional relation between the stator, the rotor, and the housing of the axial gap rotary electric machine of related art and illustrating only a cross section on one side with respect to a main shaft 60. In FIG. 8, the stator 30 including an iron core 31 and a coil 33 is filled with an insulation resin, molded by a mold 39 and fixed to the housing 40. Further, the two rotors 20 constituted by the rotor yoke 22 and the permanent magnets 21 are disposed to sandwich the stator 30 in the direction of the main shaft 60. Also, the rotor 20 is held to be rotatable by a bearing 65 disposed on a bracket 48 coupled to the housing 40. Further, the connecting wire 55 to which the coil rising wire drawn from the coil 33 of the stator 30 is fastened is also filled with the insulation resin and molded by the mold 39.

Here, as illustrated in FIG. 7, since the wiring piece 56 for supporting the connecting wire cannot be provided for the lead-out part 45 provided in the housing 40, there is a problem that the connecting wire is pushed and moved in the outer peripheral direction by the sealing pressure of the resin flowing toward the lead-out part 45 at the time of the resin molding, and comes into contact with the housing 40 to cause deterioration.

Therefore, in the axial gap rotary electric machine of the present embodiment, the fastening region with the connecting wire of the coil rising wire from the core unit is disposed to avoid the region facing the lead-out part. In other words, the coil rising wire from the core unit is configured to be fastened to the connecting wire except in the region facing the lead-out part.

Figure 1:
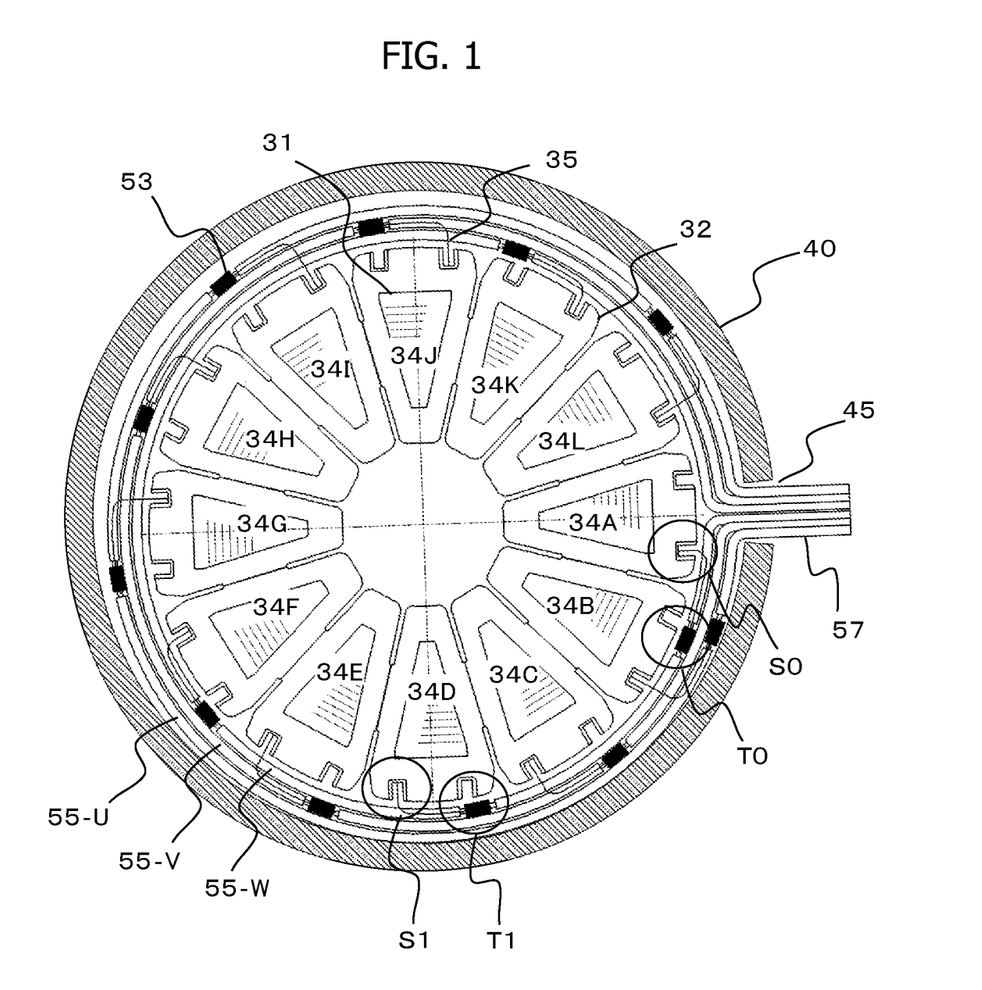
FIG. 1 is a schematic view illustrating wiring of a stator and a connecting wire of an axial gap rotary electric machine in the embodiment.

FIG. 1 is a schematic view illustrating wiring of the stator and the connecting wire of the axial gap rotary electric machine in the present embodiment. FIG. 1 is a top view of the stator 30 provided in the housing 40 as viewed in the main shaft direction, and is a view in a case where the wiring piece 56 is omitted without the mold formation. In FIG. 1, in the stator, twelve core units 34A to 34L are annularly disposed around the main shaft. Further, the coil rising wire 35 rises from each of the core units 34A to 34L, and is fastened by the connecting wire 55 to be connected for each layer (each of the connecting wires of the respective UWV layers is defined as 55-U, 55-V, and 55-W) and a T-type terminal 53. Further, the connecting wire 55 is connected to the power supply terminal via a terminal box or the like extracted out of the lead-out part 45 provided in the housing 40, as the lead-out wire 57 provided in the housing 40.

Here, the fastening regions of the core unit 34A facing the lead-out part 45 provided in the housing and the coil rising wires 35 of the other core units 34B to 34L will be described below with reference to FIGS. 2 and 3.

Figure 2:
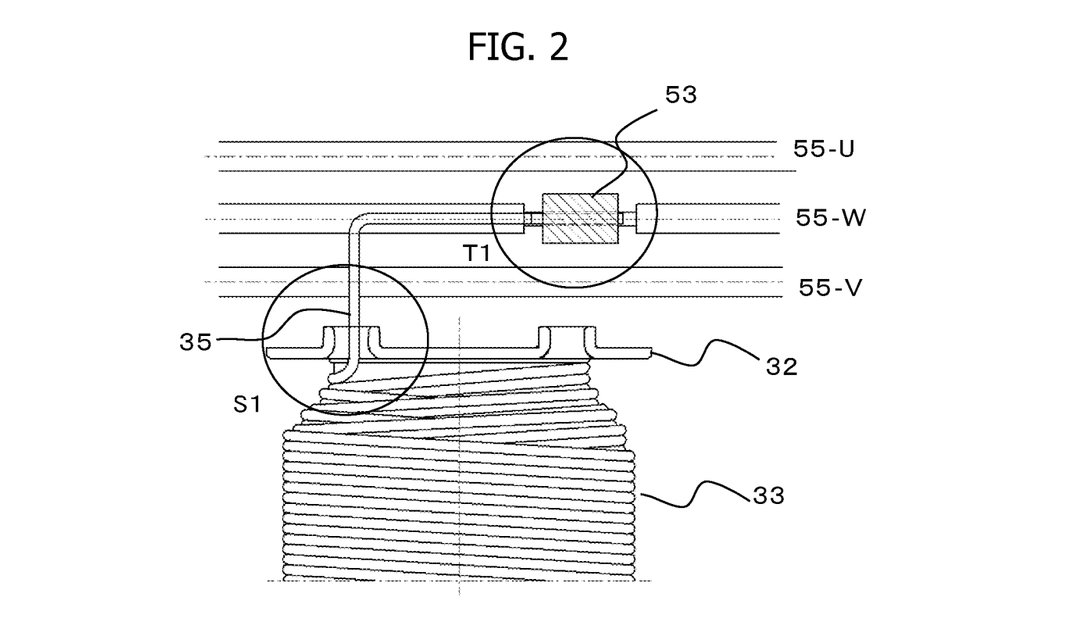
FIG. 2 is an enlarged view of a coil rising part and a fastening part from a core unit other than a lead-out part of the axial gap rotary electric machine in the embodiment.
Figure 3:
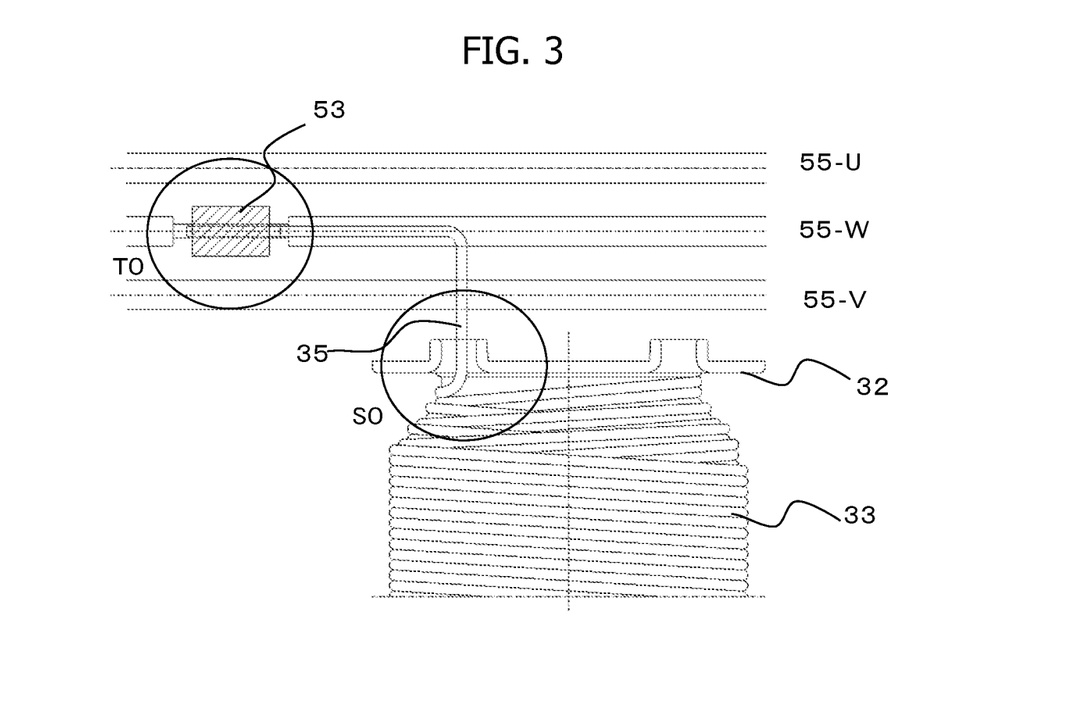
FIG. 3 is an enlarged view of the coil rising part and the fastening part from the core unit in the vicinity of the lead-out part of the axial gap rotary electric machine in the embodiment.

FIG. 2 is an enlarged view of a coil rising part and a fastening part from a core unit not facing the lead-out part, of the axial gap rotary electric machine in the present embodiment. That is, FIG. 2 is an enlarged view of a core unit 34D as a core unit not facing the lead-out part in FIG. 1, as viewed from the outer periphery, and the coil rising wire 35 raised by the coil rising part S1 is bent to the right side of the sheet, and fastened (T1) to the connecting wire 55-W with the T-type terminal 53. On the other hand, FIG. 3 is an enlarged view of a coil rising part and a fastening part from the core unit facing the lead-out part, of the axial gap rotary electric machine in the present embodiment. That is, FIG. 3 is an enlarged view of the core unit 34A, which is a core unit facing the lead-out part in FIG. 1, as viewed from the outer periphery, and the coil rising wire 35 raised by the coil rising part S0 is bent to the left side of the sheet, and is fastened (T0) to the connecting wire 55-W by the T-type terminal 53. That is, any fastening regions (T0, T1) are provided at positions facing the inner wall of the housing and not facing the lead-out part which is an opening of the housing.

In this way, in FIG. 1, the coil rising wire 35 from the core units 34B to 34L not facing the lead-out part 45 is bent in the counterclockwise direction in the circumferential direction orthogonal to the rotation shaft and fastened to connecting wire 55. On the other hand, the coil rising wire 35 from the core unit 34A facing the lead-out part is bent in the clockwise direction and fastened to the connecting wire 55. Further, the coil rising wire from the core unit not facing the lead-out part may be bent in the clockwise direction, and the coil rising wire from the core unit facing the lead-out part may be bent in the counterclockwise direction.

With such a configuration, it is possible to dispose the fastening region to the connecting wire of the coil rising wire from the core unit 34A facing the lead-out part 45 so as to avoid the region facing the lead-out part 45. In other words, the coil rising wire from the core unit can be configured to be fastened to the connecting wire except in the region facing the lead-out part. Therefore, the coil rising wire can be prevented from being pushed and moved in the outer peripheral direction by the sealing pressure of the resin flowing toward the lead-out part 45 at the time of resin molding, and it is possible to prevent the problem that the coil rising wire comes into contact with the housing 40 to cause a deterioration. That is, it is possible to provide an axial gap rotary electric machine capable of improving the reliability of the coil rising wire even if the stator is integrally molded.

In addition, by making the bending direction of the coil rising wire from the plurality of core units not facing the lead-out part the same, it is possible to suppress the overlapping region of the fastening regions, and save the space of the arrangement region of the connecting wire in the radial direction. However, because it is not related to the movement of the coil rising wire due to the sealing pressure of the resin flowing toward the lead-out part at the time of resin molding, it is not necessary to make the bending direction of the coil rising wire from the plurality of core units not facing the lead-out part the same direction.

As described above, since the present embodiment is configured so that the fastening region with the connecting wire of the coil rising wire from the core unit is disposed to avoid the region facing the lead-out part, in other words, the coil rising wire from the core unit is fastened to the connecting wire except in the region facing the lead-out part, it is possible to prevent the movement of the coil rising wire at the time of resin molding.

Although the embodiments have been described above, the present invention is not limited to the above-described embodiments, and includes various modified examples. For example, although the above-described embodiment has been described by way of an example of an axial gap rotary electric machine of one stator and two rotors, it is apparent that the invention can be applied to one stator and one rotor or two stators and one rotor.

REFERENCE SIGNS LIST

11 Mold lower die
12 Mold middle die
13 Mold upper die
20 Rotor
21 Permanent magnet
22 Rotor yoke
30 Stator
31 Iron core
32 Bobbin
33 Coil
34, 34A to 34L Core unit
35 Coil rising wire
39 Mold
40 Housing
45 Lead-out part
48 Bracket
53 T-type terminal
55, 55-U, 55-V, 55-W Connecting wire
56 Wiring piece
57 Lead-out wire
60 Main shaft
65 Bearing

The invention claimed is:

1. An axial gap rotary electric machine which has a stator having a connecting wire for fastening a coil rising wire from a plurality of core units formed by disposing the plurality of core units having coils in an annular shape around a rotation shaft for each layer; a rotor disposed to face the stator in the direction of the rotation shaft; a rotation shaft rotating with the rotor; and a housing for fixing the stator,
wherein the housing has a lead-out part which extracts the connecting wire out of the housing,
the stator is provided so that a fastening region with the connecting wire of the coil rising wire from a first core unit is disposed to avoid a region facing the lead-out part, the stator being integrally molded, and
the coil rising wire is fastened to the connecting wire by a T-type terminal in the fastening region, which is located in an axially offset position from radially outside of the first core unit.

2. The axial gap rotary electric machine according to claim 1, wherein, when the coil rising wires from the plurality of core units are fastened to the connecting wire, the stator bends the coil rising wires in a circumferential direction orthogonal to the rotation shaft and fastens the coil rising wires to the connecting wire, and among the plurality of core units, a direction of bending in the circumferential direction of the coil rising wire from the core unit facing the lead-out part is different from a direction of bending in the circumferential direction of the coil rising wire from the core unit not facing the lead-out part.

3. The axial gap rotary electric machine according to claim 1, wherein the stator is provided with a wiring piece for supporting a fastening part of the coil rising wire to the connecting wire in a core unit not facing the lead-out part.

4. An axial gap rotary electric machine which has a stator having a connecting wire for fastening a coil rising wire from a plurality of core units formed by disposing the plurality of core units having coils in an annular shape around a rotation shaft for each layer; a rotor disposed to face the stator in the direction of the rotation shaft; a rotation shaft rotating with the rotor; and a housing for fixing the stator,
wherein the housing has a lead-out part which extracts the connecting wire out of the housing,
the stator is configured to fasten the coil rising wire from a first core unit with the connecting wire except in a region facing the lead-out part, the stator being integrally molded, and
the coil rising wire is fastened to the connecting wire by a T-type terminal in the fastening region, which is located in an axially offset position from radially outside of the first core unit.

5. The axial gap rotary electric machine according to claim 4, wherein, when the coil rising wires from the plurality of core units are fastened to the connecting wire, the stator bends the coil rising wires in a circumferential direction orthogonal to the rotation shaft and fastens the coil rising wires to the connecting wire, and among the plurality of core units, a direction of bending in the circumferential direction of the coil rising wire from the core unit facing the lead-out part is different from a direction of bending in the circumferential direction of the coil rising wire from the core unit not facing the lead-out part.

6. The axial gap rotary electric machine according to claim 4, wherein fastening of the coil rising wire to the connecting wire is fastened by a T-type terminal.

7. The axial gap rotary electric machine according to claim 4, wherein the stator is provided with a wiring piece for supporting a fastening part of the coil rising wire to the connecting wire in a core unit not facing the lead-out part.

8. An axial gap rotary electric machine which has a stator having a connecting wire for fastening a coil rising wire from a plurality of core units formed by disposing the plurality of core units having coils in an annular shape around a rotation shaft for each layer; a rotor disposed to face the stator in the direction of the rotation shaft; a rotation shaft rotating with the rotor; and a housing for fixing the stator, wherein the housing has a lead-out part which extracts the connecting wire out of the housing, the stator is provided such that a fastening region in which the coil rising wire from a first core unit is fastened with the connecting wire is provided at a position facing an inner wall of the housing and not facing the lead-out part, the stator being integrally molded, and the coil rising wire is fastened to the connecting wire by a T-type terminal in the fastening region, which is located in an axially offset position from radially outside of the first core unit.

\* \* \* \* \*